United States Patent [19]

Hensel, Jr.

[11] 4,025,101

[45] May 24, 1977

[54] VEHICLE BODY INCLUDING RUSTPROOFING MEANS

[76] Inventor: Paul E. Hensel, Jr., 915 Beverly Court, Eastlake, Ohio 44094

[22] Filed: Sept. 29, 1976

[21] Appl. No.: 727,856

[52] U.S. Cl. ............................... 296/1 R; 169/62; 239/130; 427/236

[51] Int. Cl.² ........................................ B60R 27/00

[58] Field of Search ............... 118/506, 300; 291/1; 169/62; 296/1 R, 28 F; 239/130; 134/123

[56] References Cited

UNITED STATES PATENTS

| 2,388,114 | 10/1945 | Boyce | 291/1 X |
|---|---|---|---|
| 2,536,694 | 1/1951 | Olsen | 169/62 X |
| 3,139,096 | 6/1964 | Harris | 296/1 X |
| 3,227,575 | 1/1966 | Ziebart | 427/236 |
| 3,336,064 | 8/1967 | Dzaack | 291/1 |
| 3,515,218 | 6/1970 | Gardner et al. | 169/62 X |
| 3,599,869 | 8/1971 | Oberdorfer | 239/130 X |
| 3,779,324 | 12/1973 | Kreske, Jr. | 291/1 X |

Primary Examiner—Morris Kaplan

[57] ABSTRACT

A method and apparatus for rustproofing relatively inaccessible areas of a vehicle body wherein a quantity of rust-proofing liquid is stored on the vehicle and distribution means incorporated in the vehicle structure and communicating with said tank provided for connection to an external pressure source and for pressurized spray of said liquid against rust prone areas of the body. In accordance with a preferred embodiment of the invention a non-drying, non-corrosive oil such as automatic transmission fluid is used as the rustproofing liquid.

1 Claim, 4 Drawing Figures

VEHICLE BODY INCLUDING RUSTPROOFING MEANS

This invention relates to rustproofing the relatively inaccessible areas of automobile bodies, and more particularly to an apparatus for periodically applying a non-drying rustproofing material to such areas.

In recent years it has become common to apply a rustproof coating to the relatively inaccessible hollow areas of an automotive vehicle, such as the interiors of doors, the areas under the hood adjacent the headlights, the areas under the trunk lid, and the wheel wells.

A typical method, apparatus and material for applying such a coating is described in U.S. Pat. No. 3,227,575, assigned to Ziebart Process Corporation. While such systems have been generally effective, they depend on a single application of a drying-type coating professionally applied using specialized tools for their effectiveness. Accordingly, the process is relatively expensive and the average car owner does not expect to have the coating periodically reapplied. Also, because of the special equipment and materials required the process does not lend itself itself to home application in so-called do-it-yourself fashion.

Another deficiency of existing systems is that although the coatings are superior to the previously used hard asphaltic coatings, they are of a type which dries to the touch to form a paint-like coating. As such they are not capable of entering into and coating the interior surfaces of spot-welded seams, which are commonly used in automobile body construction. These seams, which are found around the bottoms of the doors, around the trunk lid, where inner and outer fender panels meet and other places, are often where rust begins.

What is needed to protect the above areas is a relatively thin coating of a non-corrosive viscous liquid which does not dry and which is capable of entering the areas of spot-welded seams between the welds. One reason why such coating is not now applied professionally is that such coatings eventually evaporate or become washed away by the moisture which inevitably enters these areas. As a result it is necessary to periodically reapply the coating. What this invention seeks to provide is a means whereby such coating can be simply and economically applied and reapplied.

Based on the above, it is an object of the invention to provide an automotive rustproofing system which is capable of protecting the interior areas of seams occuring in relatively inaccessible areas of the vehicle body.

Another object of the invention is to provide an apparatus for rustproofing areas of a vehicle body by periodically spraying such areas with a non-drying, non-corrosive oil compound.

Another object of the invention is to provide apparatus permanently mounted on the automotive vehicle for storing a rustproofing compound and for periodically spraying said compound on selected areas of the vehicle body.

Another object of the invention is to provide apparatus as above which is adapted for simple, non-professional installation in kit form.

Another object of the invention is to provide apparatus as above requiring minimal alteration of the existing vehicle structure and controls.

To meet the above objectives the present invention provides a rustproofing system capable of being supplied in kit form, including a container adapted to be mounted on the vehicle firewall, a plurality of tubes having nozzles formed in the walls thereof connected to the container and mounted within the rustprone areas of the vehicle body and a connector formed on the container for applying air pressure to the interior of the container. According to a preferred embodiment of the invention automatic transmission fluid is used as the rustproofing or rust preventive medium and the air pressure connection is in the form of a tire valve stem molded or cemented to a wall of the container and communicating with the interior thereof.

In accordance with the apparatus of the invention the container is filled with automatic transmission fluid. At selected time intervals pressurized air is applied to the connector, pressurizing the interior of the container and forcing the transmission fluid through the tubes to be sprayed out of the nozzles formed in the tube walls and onto the metal surfaces. The fluid flows freely along the metal surfaces and readily penetrates and coats the various seams and other rust-prone areas within the body area within which each tube is mounted. It can be appreciated that the fluid does not dry and therefore, does not tend to trap moisture within areas it cannot penetrate, as other rustproofing methods are prone to do. Because of its ability to penetrate and protect spot-welded seams and the like without drying the fluid is subject to evaporation and dissipation; however, in accordance with this invention the rustproof coating is very easily reapplied again and again at intervals determined by the use to which the vehicle is put, weather conditions in the area and the extent to which road salt and other corrosive substances are present in a given area.

Other objects and advantages of the invention will become more apparent from the following description when taken in connection with the accompanying drawings; wherein.

Figure 1:
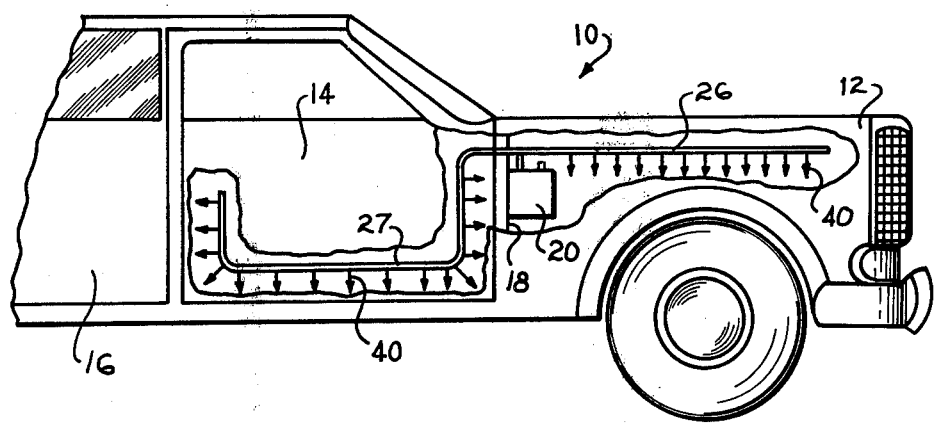
FIG. 1 is a partial side elevation, with parts cut away, of an automobile equiped with the invention.

Referring to FIG. 1 there is illustrated an automobile, designated generally by the numeral 10, comprising fenders or front quarter panels 12 (one of two shown), and a firewall 18 separating the engine compartment from the passenger compartment of the automobile.

Figure 2:
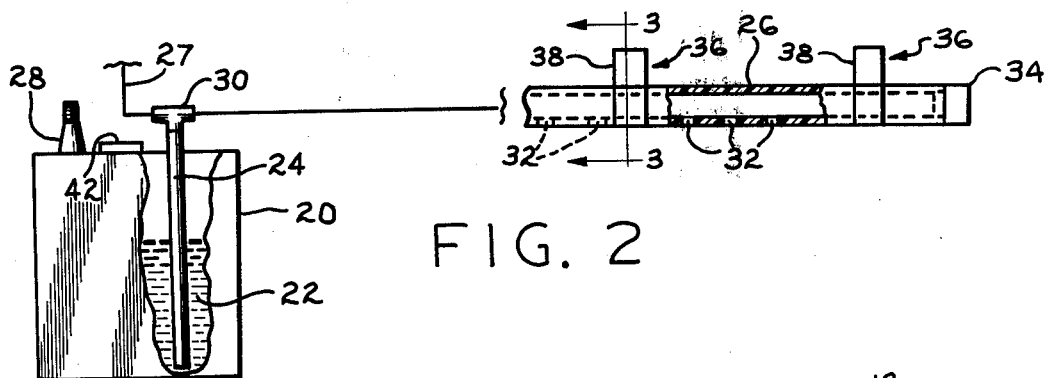
FIG. 2 is a schematic representation of the invention.

Referring particularly to FIG. 2, the apparatus of the present invention comprises a container or tank 20 for storing a quantity of rustproofing or rust preventive fluid 22, a supply tube 24 submerged in the fluid 22, a plurality of distribution tubes 26, 27 connected to the supply tube 24, and an air valve 28 mounted on the tank 29 for pressurizing the interior thereof.

The tank 29 can be of a type similar in size and design to the plastic tanks commonly used for storing windshield washer fluid and is illustrated as being mounted on the firewall 18. The tank 20 can be mounted by any convenient means, and it will be appreciated that the tank can also be mounted in other places, such as to the interior of a fender, adjacent the radiator, etc.

Figure 3:
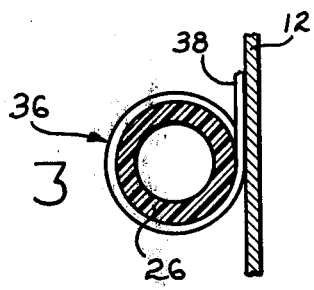
FIG. 3 is a sectional view taken along line 3-3 of FIG. 2.

In the embodiment illustrated two distribution tubes are shown connected to the supply tube 24 by means of a tee 30. Distribution tube 26 is attached to and extends along the interior of front fender 12, and distribution tube 27 is attached to and extends along the interior of the door 14 adjacent the spot-welded seams. Each distribution tube comprises a plastic tube having a plurality of holes 32 formed therein to define spray nozzles. One end of each tube is connected to the tee 30 and the opposite end is sealed by a plug 34. In the illustrated embodiment the distribution tubes 26, 27 are attached to the interior of the vehicle body by means of a plurality of tabs 36 formed of double-sided tape of the type commonly used to attach trim strips and the like to the exterior of the vehicle body. As shown in FIG. 3 each tab 36 is formed of a length of tape wrapped partially around the tube with an extended portion 38 adhered to the body panel. A sufficient number of tabs are used to support each tube as shown with the holes 32 opening toward the rust-prone seams in the body panel to which the tube is attached. As illustrated, one tank 20 serves the distribution tubes 26, 27 for the fender and front door on one side of the vehicle. A separate apparatus comprising a tank and associated tubes can be installed to serve the opposite side of the vehicle, or additional tubes can be connected to the supply tube 24. It can also be appreciated that additional tanks can be installed in the vehicle trunk to serve the rear doors, rear fenders or quarter panels, trunk lid, and the like.

The holes 32 form nozzles for spraying the rust preventive fluid against the body panels, as depicted by the arrows 40 in FIG. 1. According to one aspect of the invention the fluid is sprayed by pressurizing the tank 20 with compressed air. For this purpose the air valve 28 comprises a standard tubeless tire valve extending through a hole formed in a wall of the tank 20 and cemented or molded thereto. To charge the system fluid is poured into the tank 20 through a suitable capped opening 42. The valve 28 keeps the tank sealed until it is desired to pressurize the system. When the rust preventive fluid is be sprayed into the areas to be rustproofed a filling station air hose or hand tire pump is attached to the valve 28 in a conventional manner. When the interior of the tank is pressurized fluid is forced through the supply tube 24, into the distribution tubes 26, 27, and out the holes 32 and against the body panels.

Figure 4:
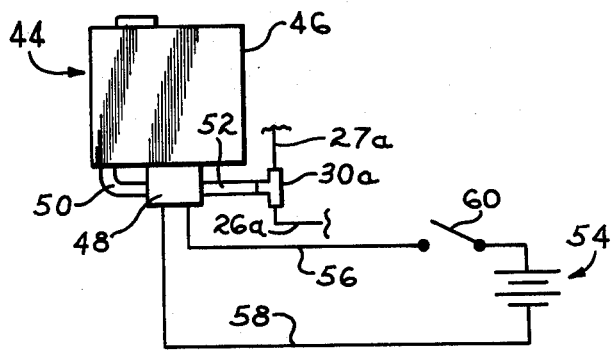
FIG. 4 is a schematic view of an alternative embodiment of the invention.

It can be appreciated that within the scope of the invention other means can be provided for forcing the fluid through the holes or nozzles 32. For example, an integral electric pump unit such as those used in conjunction with windshield washer units can be used, or a simple hand-operated air pump can be mounted directly on the tank 20. In FIG. 4 there is illustrated an alternative embodiment of the invention using a windshield washer type unit 44 to store and distribute the rust preventive fluid. The unit 44 comprises a tank 46 and a pump unit 48. The pump unit is attached directly to the body of the tank 46, with the inlet of the pump being connected to the tank by means of a tube 50. A pump outlet tube 52 ends in a tee 30a to which distribution tubes 26a and 27a are connected similar to the embodiment shown in FIG. 2. The pump 48 is an electrically powered unit connected in a circuit including a battery 54 connected to the pump unit by electrical lines 56 and 58, and a switch 60. The switch can be located on the vehicle instrument panel for convenience.

The rust preventive fluid used in the practice of the invention can be one of a variety of non-drying, non-corrosive liquids; however, it has been found that automatic transmission fluid is particularly effective. Thus, best results can be obtained by using oil having a low temperature viscosity of 55,000 cp maximum at −40° F. and superior corrosion resistance. As set forth in SAE specification J3116 there is no universally accepted bench test procedure for evaluating corrosion resistance of transmission fluids; however, the following tests are considered to be useful: ASTM D1748 and ASTM D665.

OPERATION

In the practice of the invention a supply of a non-drying, non-corrosive, viscous liquid, and means to distribute the fluid in spray form to rust-prone areas of the vehicle body are provided on the vehicle. At selected time intervals the distribution means is activated to spray the liquid against selected body panels where it flows along the panels and penetrates seams and other areas where rust is likely to start. In accordance with a preferred embodiment of the invention a tank for containing the rust preventive fluid is mounted on the vehicle firewall and is selectively pressurized by applying air pressure to a standard tire valve fitted to the tank. The pressurized fluid is distributed through tubes attached to the selected body panels and having holes formed therein to define a plurality of spray nozzles.

I claim:

1. Apparatus for rustproofing a selected area of a vehicle body comprising a tank mounted on said vehicle body for storing a quantity of rustproofing liquid, means connected to said tank for distributing said rustproofing liquid to said selected area of said vehicle body, means operatively associated with said tank for transferring said liquid from said tank to said distributing means said means for distributing comprising conduit means disposed along the interior side of the vehicle body and adjacent said selected area, said conduit means having a plurality of perforations corresponding to said selected area and through which said liquid is dispensed onto said area, and a readily accessible tire valve mounted on the vehicle body and communicating with said tank whereby air compressor means may be connected to said valve to pressurize said tank and to dispense said rustproofing liquid through said perforated conduit and onto said selected area.

* * * * *